(12) United States Patent
Ruttik et al.

(10) Patent No.: US 11,716,698 B2
(45) Date of Patent: Aug. 1, 2023

(54) TRANSMISSION MANAGEMENT (71) Applicant: Skylo Technologies, Inc., Palo Alto, CA (US)

(72) Inventors: Kalle Ruttik, Espoo (FI); Keijo Lehtinen, Espoo (FI); Yihenew Beyene, Espoo (FI); Marko Keskinen, Espoo (FI); Riku Jantti, Espoo (FI)

(73) Assignee: Skylo Technologies, Inc., Palo Alto, CA (US)

( * ) Notice: Subject to any disclaimer, the term of this patent is extended or adjusted under 35 U.S.C. 154(b) by 7 days.

(21) Appl. No.: 17/241,630

(22) PCT Filed: Sep. 23, 2019

(86) PCT No.: PCT/FI2019/050682
§ 371 (c)(1),
(2) Date: Apr. 27, 2021

(87) PCT Pub. No.: WO2021/058852
PCT Pub. Date: Apr. 1, 2021

(65) Prior Publication Data
US 2022/0346048 A1    Oct. 27, 2022

(51) Int. Cl.
*H04W 56/00* (2009.01)
*H04B 7/185* (2006.01)

(52) U.S. Cl.
CPC .... *H04W 56/0045* (2013.01); *H04B 7/18513* (2013.01); *H04W 56/0065* (2013.01)

(58) Field of Classification Search
CPC ......... H04W 56/0045; H04W 56/0065; H04W 56/0015; H04B 7/18513; H04B 7/1851
See application file for complete search history.

(56) References Cited

U.S. PATENT DOCUMENTS

| | | | |
|---|---|---|---|
| 6,529,731 B2 | 3/2003 | Modzelesky et al. | |
| 6,591,084 B1 | 7/2003 | Chuprun et al. | |
| 6,633,559 B1* | 10/2003 | Asokan | H04B 7/2656 |
| | | | 370/335 |
| 9,455,777 B1 | 9/2016 | Johnson et al. | |
| 9,622,259 B2 | 4/2017 | Johnson et al. | |
| 2014/0181288 A1 | 6/2014 | Potkonjak | |
| 2016/0028533 A1* | 1/2016 | Kazmi | H04W 56/0045 |
| | | | 370/296 |
| 2016/0125471 A1 | 5/2016 | Hsu et al. | |
| 2018/0359811 A1 | 12/2018 | Verzun et al. | |
| 2020/0154383 A1* | 5/2020 | Sutton | H04W 74/0833 |

* cited by examiner

*Primary Examiner* — Ashley Shivers
(74) *Attorney, Agent, or Firm* — Brian R. Short (57) ABSTRACT

The invention relates to a solution for determining an allowable round trip time for a communication between a base station and a terminal device served by the base station in an asynchronous communication system, At least some aspects of the solution relate to a method performed by a controller, the method comprises: determining round trip times of terminal devices served by the base station; selecting a maximum round trip time among the determined round trip times of the terminal devices served by the base station as the allowable round trip time; and delivering the selected allowable round trip time to the base station. The solution also relates to applying the determined round trip time by a base station and a terminal device as well as to a system comprising the mentioned entities and to computer program products.

18 Claims, 5 Drawing Sheets

TRANSMISSION MANAGEMENT

RELATED APPLICATIONS

This application is a national stage application, filed under 35 U.S.C. § 371, of International Patent Application No. PCT/FI2019/050682 filed on Sep. 23, 2019, which is incorporated by reference herein in its entirety.

FIELD OF THE DESCRIBED EMBODIMENTS

The invention concerns in general the technical field of telecommunications. More particularly, the invention concerns management of transmission.

BACKGROUND

In communication systems having long distances between communicating parties so-called link devices are used for transmitting signals. For example, cellular based communication system may comprise, or at least utilize, satellite links, which are used for connecting long distance communicating entities, such as a base station and terminal devices. This kind of communication system has a drawback that a signal round trip time (RTT) is long and varies between different terminal device served by the base station.

The signal round trip time consists of several factors. At least some of the commonly known factors making it challenging to manage by the communication system in question are a propagation delay and variation therein between the terminal devices as well as a fronthaul delay (in Cloud Radio Access Networks), for example.

In the current cellular systems using a frame based communication the RTT is compensated by so-called timing advance procedure. In other words, since terminal devices could be at different distances from the base station, the synchronous time based nature of the system is maintained by aligning transmissions of the terminal devices. This may be done so that the signals from each of them are arranged to arrive to the base station at the same time. Thus, the further located terminal devices shall start to transmit earlier than closely located terminal devices. The time the terminal device shifts its transmission is called timing advance. In the existing solutions the maximum timing advance is defined to correspond to propagation delay from the cell border to the base station.

For example, the timing advance in 3GPP cellular system can compensate the RTT in order of hundreds microsecond. The system cannot have longer RTT delay since otherwise the timing advance procedure is not capable to keep the users synchronized. The RTT delay shall also be short enough to keep uplink (UL) and downlink (DL) frames aligned so that they can follow the same frame numbering. However, the existing timing advance method is not suitable for the link device based system, such as a satellite system, where the RTT delay could exceed the subframe length.

In more detail, the frames are constructed from time slots, called as sub-frames (SF). Terminal devices have to transmit signals that fit into time slot structure, since the data allocation into time slots is predefined. The system is set up such that at the base station transmission of all terminal devices are synchronous, the signals from different terminal devices sending to the same time slot have to arrive to base station at the same time.

In general, the timing advance for a terminal device is set during terminal device attachment to base station. While receiving first signal from the terminal device the base station measures the signal arrival moment with respect to the SF beginning. The difference between the symbol beginning the frame structure and the actual transmitter symbol arrival time is due to the propagation delay. The propagation delay is compensated by informing the terminal device which has to estimate the actual delay value. The terminal device uses this delay value and, as mentioned, starts the data transmission in advance, and hence it applies the timing advance method. The symbol transmitted with timing advance arrives at the base station exactly at the symbol starting time in the corresponding frame.

As mentioned, in some systems and situations with long RTT, like for instance with satellite based systems, the long RTT delay cannot be compensated with the current 3GPP system timing advance mechanism. This is because the timing advance e.g. in the fourth generation 3GPP specified system is maximum of a few hundred microseconds corresponding to about the 100 km propagation delay. The propagation delay does not exceed the SF length and therefore uplink (UL) and downlink (DL) are using the same frame numbering. The cellular systems use frame number for synchronizing DL and UL signal transmissions. For instance, for accounting the processing delay in a terminal device the signal send in DL has to be answered with UL signal transmitted after k SF. For knowing in which SF the signal is transmitted the cellular system uses frame numbers. In terrestrial systems propagation delay in radio interface is so small that the DL and UL can use the same frame numbering. The RTT delay is much shorter than the sub-frame length and the frame numbers are therefore not unambiguous. For satellite system the RTT can exceed not only the sub-frame length but even the frame period. This can also occur in the C-RAN if the distance between BBU and RRH is large. Frame numbers are periodic and reused after some time. For very long RTT the delay exceeding reuse period length the frame numbering becomes ambiguous.

Hence, there is a need to develop solutions suitable for synchronizing transmissions of terminal devices in communication systems having long RTT.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An object of the invention is to present methods, apparatuses, computer program products and a system for managing a transmission between communicating entities.

The objects of the invention are reached by methods, apparatuses, computer program products and a system as defined by the respective independent claims.

According to a first aspect, a method for determining an allowable round trip time for a communication between a base station and a terminal device served by the base station in an asynchronous communication system is provided, the method comprises: determining, by a controller, round trip times of terminal devices served by the base station; selecting, by the controller, a maximum round trip time among the determined round trip times of the terminal devices served by the base station as the allowable round trip time; and delivering, by the controller, the selected allowable round trip time to the base station.

The base station may be instructed to transmit a paging request for determining the round trip times of the terminal devices served by the base station.

According to a second aspect, a controller for determining an allowable round trip time for a communication between a base station and a terminal device served by the base station in an asynchronous communication system is provided, the controller comprising: at least one processor; and at least one memory including computer program code; the at least one memory and the computer program code configured to, with the at least one processor, cause the controller to: determine round trip times of terminal devices served by the base station; select a maximum round trip time among the determined round trip times of the terminal devices served by the base station as the allowable round trip time; and deliver, by the controller, the selected allowable round trip time to the base station.

The controller may be arranged to instruct the base station to transmit a paging request for determining the round trip times of the terminal devices served by the base station.

According to a third aspect, a computer program product for determining an allowable round trip time is provided which, when executed by at least one processor, cause a controller to perform the method according to the first aspect.

According to a fourth aspect, a method for synchronizing a communication with a terminal device is provided, the method comprising: receiving, by a base station, data indicating an allowable round trip time of the communication with the terminal device; adjusting, by the base station, a counter for downlink communication and a counter for uplink communication in accordance with the data indicating the allowable round trip time for synchronizing the communication with the terminal device.

The method may further comprise: delivering, by the base station, data representing the allowable round trip time to the terminal device.

According to a fifth aspect, a base station for synchronizing a communication with a terminal device is provided, the base station comprising: at least one processor; and at least one memory including computer program code; the at least one memory and the computer program code configured to, with the at least one processor, cause the base station to: receive data indicating an allowable round trip time of the communication with the terminal device; adjust a counter for downlink communication and a counter for uplink communication in accordance with the data indicating the allowable round trip time for synchronizing the communication with the terminal device.

The base station may further be configured to: deliver data representing the allowable round trip time to the terminal device.

According to a sixth aspect, a computer program product for synchronizing a communication with a terminal device is provided which, when executed by at least one processor, cause a base station to perform the method according to the fourth aspect.

According to a seventh aspect, a method for synchronizing a communication with a base station is provided, the method comprising: receiving, by a terminal device, data indicating an allowable round trip time of the communication with the base station; determining, by the terminal device, a delay of uplink communication from the terminal device to the base station, and determining, by the terminal device, a timing advance time for initiating the uplink communication on the basis of the data indicating the allowable round trip time and the data indicating the delay of uplink communication for synchronizing the communication with the base station.

In the method, a separate logical numbering for downlink packets and uplink packets may be applied by the terminal device allowing a communication of an uplink packet at a different instant of time than the downlink packet having a same logical number as the uplink packet.

Moreover, the uplink communication may be delayed by the terminal device so that the data in the uplink communication is arranged to arrive at the base station at an instant of time corresponding to the allowable round trip time, a delay is determined in accordance with a delay in a communication due to downlink communication.

For example, the delay of uplink communication from the terminal device to the base station may correspond to a delay of downlink communication from the base station to the terminal device.

According to an eight aspect, a terminal device for synchronizing a communication with a base station is provided, the terminal device comprising: at least one processor; and at least one memory including computer program code; the at least one memory and the computer program code configured to, with the at least one processor, cause the terminal device to: receive data indicating an allowable round trip time of the communication with the base station; determine, by a delay of uplink communication from the terminal device to the base station; and determine a timing advance time for initiating the uplink communication on the basis of the data indicating the allowable round trip time and the delay of uplink communication for synchronizing the communication with the base station.

The terminal device may be arranged to apply a separate logical numbering for downlink packets and for uplink packets allowing a communication of an uplink packet at a different instant of time than the downlink packet having a same logical number as the uplink packet.

Moreover, the terminal device may be arranged to delay the uplink communication so that the data in the uplink communication is arranged to arrive at the base station at an instant of time corresponding to the allowable round trip time, a delay is determined in accordance with a delay in a communication due to downlink communication.

The delay of uplink communication from the terminal device to the base station may correspond to a delay of downlink communication from the base station to the terminal device.

According to a ninth aspect, a computer program product for synchronizing a communication with a base station is provided which, when executed by at least one processor, cause a terminal device to perform the method according to the seventh aspect.

According to a tenth aspect, an asynchronous communication system is provided, the asynchronous communication system comprises: at least one controller according to the second aspect, at least one base station according to the fifth aspect, and at least one terminal device according to the eight aspect.

The expression "a number of" refers herein to any positive integer starting from one, e.g. to one, two, or three.

The expression "a plurality of" refers herein to any positive integer starting from two, e.g. to two, three, or four.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated.

Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

In accordance with the present invention a communication system may be configured so that a propagation delay may be taken into account in an improved way in communication environments with long round trip time (RTT). In accordance with the present invention this may be achieved by determining at least one value for delay for RTT, such as a maximum delay, which is to be applied with terminal devices served by a base station, and by arranging suitable counter implementation for the communication system as will be described in the forthcoming description. The counters may e.g. be arranged in a base station and in a terminal device.

Figure 1:
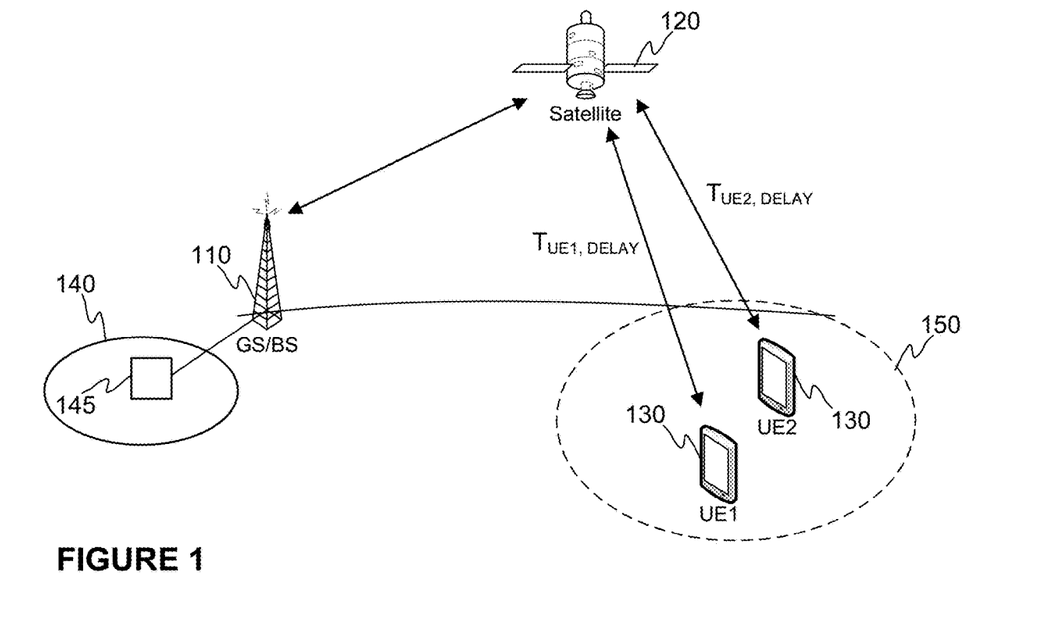
FIG. 1 illustrates schematically an example of a communication system with a long propagation delay.

For describing at least some aspects FIG. 1 is now referred to. FIG. 1 schematically illustrates a non-limiting example of a communication system having a long propagation delay possibly facing challenges due to long propagation delay of the communication path. The non-limiting example of FIG. 1 is a satellite-based system in which a geo station, called as a base station 110 communicates with a satellite 120 which, in turn, reaches end users i.e. terminal devices 130 within a service area 150 of the base station 110. In the illustrated communication environment, the terminal devices 150 may reside distant to each other which means that their distances from the satellite 130 are different. As a result, lengths of communication paths between the base station 110 and the respective terminal device 130 through the satellite 120 are different which means that the propagation delays also vary between the terminal devices 130 especially due to delay in communication from the satellite to the respective terminal devices 130 (referred as $T_{UE1, DELAY}$ and $T_{UE2, DELAY}$ in FIG. 1). The above is especially true in view of round trip time i.e. a time required for signal to travel from a source, such as from the base station 110, to a destination, such as to a respective terminal device 130, and back again. In FIG. 1 it is also schematically illustrated a core network 140 and a controller 145 therein for describing at least some aspects in the forthcoming description.

Figure 2:
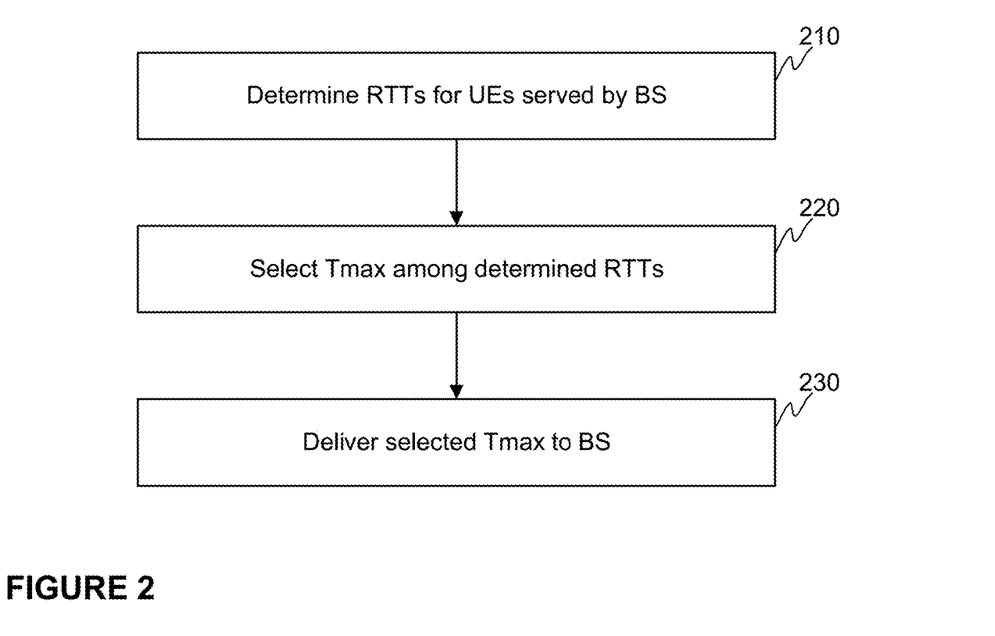
FIG. 2 illustrates schematically a method according to an example embodiment of the invention.

FIG. 2 illustrates schematically a method according to an example embodiment wherein the method may be performed by a controller 145, such as a management entity residing in a core network 140 of the communication system being responsible for at least some control operations of the communication system. An applicable entity in the core network 140 may e.g. be so-called Mobility Management Entity, MME, or Element Management System, EMS, as non-limiting examples. Alternatively, the controller performing the method as schematically illustrated in FIG. 2 may be implemented in a radio access network, such as to the base station 110. According to the method the controller 145 may be arranged to determine RTT 210 of each terminal device 130 served by a base station 110. The determination of the RTT for each of the terminal device 130 may be arranged so that the base station 110 is instructed to transmit a signal towards terminal devices 130 served by it through the communication path, such as through a satellite 120. The signal is advantageously such that it causes the terminal device 130 to respond in response to a receipt of the signal. A non-limiting example of an applicable signal transmittable by the base station 110 may e.g. be so-called paging signal or physical downlink control channel signal but any other may also be applied to. The controller 145 may be arranged to monitor that it receives responses to the transmit of the signal from all the terminal devices 130, or at least from a predetermined sub-group of the terminal devices 130 served by the base station 110. In some implementations, there may be set a rule for monitoring. For example, the rule may relate to a time during which the responses are expected to be received, and possibly responses arriving later than a predetermined time window may be ignored.

Now, the controller 145 possesses data representing RTT of a number of terminal devices 130 residing its service area. The controller 145 may be arranged to perform an operation for selecting an RTT among all the RTTs fulfilling one or more criteria. According to an example embodiment a criterion may be that the RTT having a maximum value is determined among all the RTTs. The one or more criteria may be any other, such as to determine a suitable superframe border aligned value that is bigger than any RTT being received. The superframe periodicity may e.g. be defined in accordance with an applicable telecommunication standard. For the purpose of describing at least some aspects of the present invention it is assumed here that the criteria applied to is selecting the maximum value for RTT among the determined RTTs. Hence, the controller 145 may be arranged to compare the RTTs to each other and to select 220 the one having the maximum value Tmax. Next, the controller 145 may be arranged to deliver 230 information on the selected RTT value i.e. Tmax to the base station 110. According to various example embodiments Tmax value may e.g. selected so that it is bigger as RTT to any users and as such it may e.g. be determined once at the system configuration phase.

Figure 3:
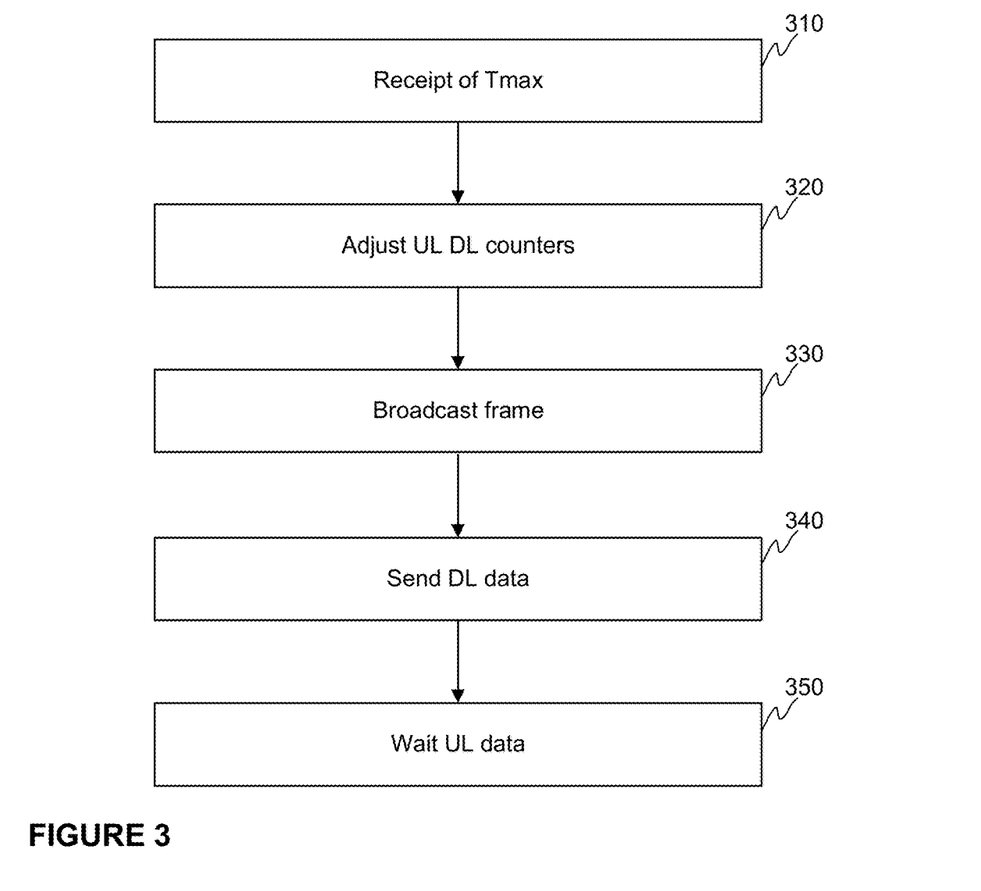
FIG. 3 illustrates schematically aspects of an operation of a base station according to an embodiment of the invention.

FIG. 3 illustrates schematically some aspects with respect to an operation of the base station 110 in response to a receipt of information on the Tmax 310. The base station 110 may obtain the information from a message received from the controller 145 and configure its operation accordingly. The configuration may comprise, but is not limited to, adjusting counters maintaining information with respect to frames in accordance with the information on the Tmax. Due to long RTT the base station 110 is configured so that at least one counter is arranged for communication path in downlink direction and at least one other counter is arranged for communication path in uplink direction. Hence, the base station is configured to operate so that when broadcasting a frame at an instant of time T0, it is arranged to monitor to receive uplink data at an instant of time T0+Tmax and the counters are adjusted accordingly. As schematically illustrated in FIG. 3 the base station may be arranged to broadcast the frame 330 and to send data towards downlink direction 340. In response to this it may be arranged to wait 350 data in uplink direction and to monitor that it arrives at the instant of time T0+Tmax+k, where k is the time needed for packet processing in case the Tmax would be 0. For example, the existing cellular systems may be thought as systems with Tmax=0 and according to the specifications the system may be allocated the time k for data processing subframes. If this does not occur, the base station 110 may be arranged to perform one or more error recovery operations accordingly. The error handling operations may e.g. be the same as defined in the corresponding terrestrial system. For instance, base station 110 may demand retransmission of data.

Figure 4:
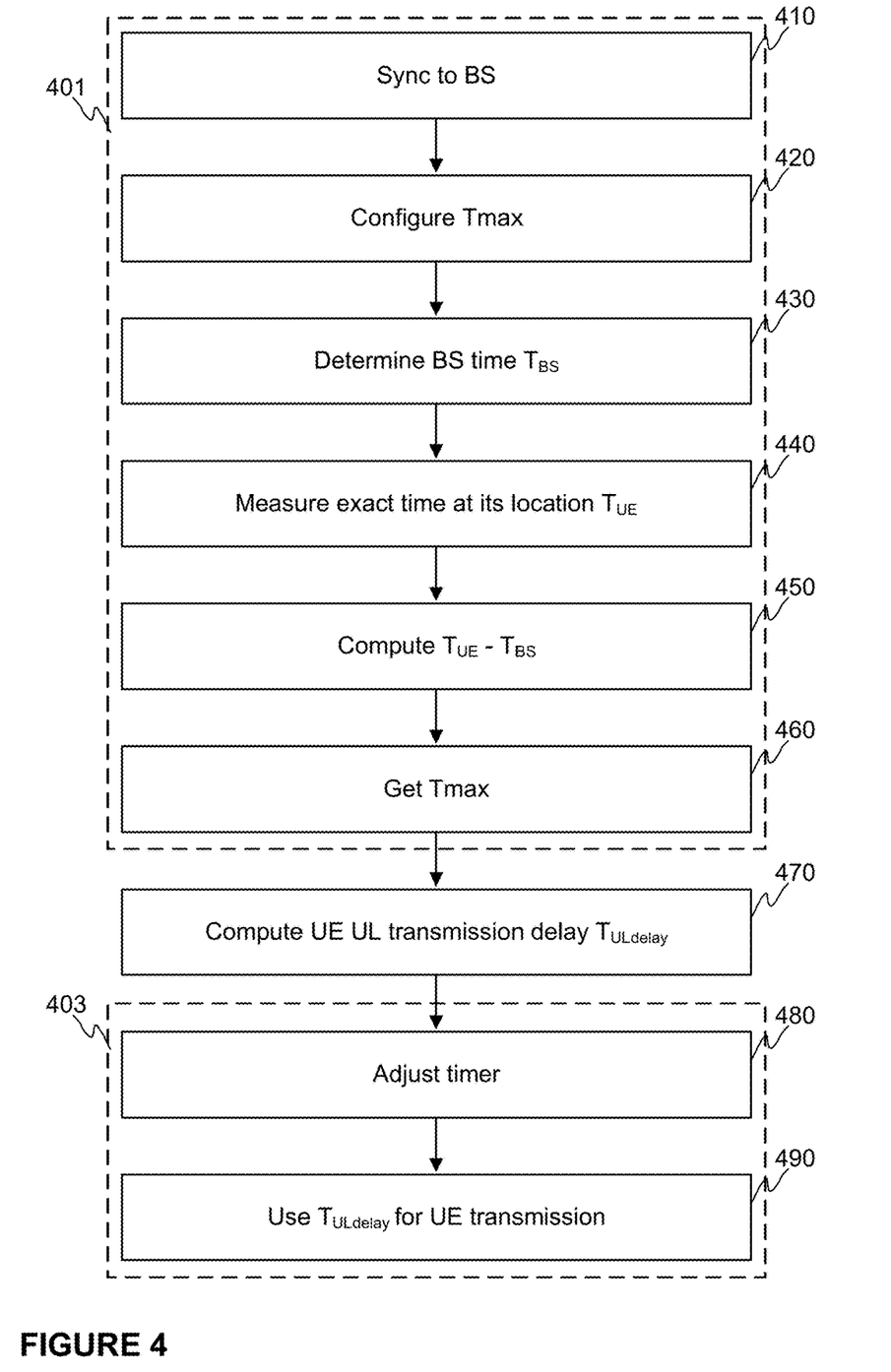
FIG. 4 illustrates schematically aspects of an operation of a terminal device according to an embodiment of the invention.

Correspondingly, FIG. 4 illustrates an operation at the terminal device 130 side in accordance with the selected Tmax as a non-limiting example. In order to communicate with the base station 110 the terminal device 130 is synchronized 410 to communicate with the base station. The synchronization may e.g. be based on listening to so-called synchronization channel and detecting specific data, such as a synchronization frame therefrom. The terminal device 130 may receive e.g. Tmax information therefrom and configure 420 its operation with the information on the Tmax. In response to the configuration the terminal device 130 may have set the transmission timers and frame counters for uplink UL and downlink DL directions accordingly. Alternatively or in addition, the Tmax may also be a network specific parameter configured offline into terminal devices 130. Further, the terminal device 130 may be arranged to determine, i.e. read, 430 the time applied to in the base station 110 from the data received from the base station 110, such as from the synchronization channel. Moreover, the terminal device 130 may be arranged to measure 440 exact time at its location $T_{UE}$. The exact time may e.g. be obtained on a basis of data received from a positioning system, such as GPS. Next, the terminal device 130 may compute 450 the time difference $T_{UE}-T_{BS}$ between the time used by the terminal device 130 and the time used by the base station 110. Then, the terminal device 130 may take the time difference into account in order to initiate the uplink communication at a correct instant of time. In response to the determination of the time difference the terminal device 130 may obtain the information on the Tmax 460 and compute 470 uplink transmission delay $T_{ULdelay}$ accordingly for the terminal device 130. The uplink transmission delay $T_{ULdelay}$ may be determined as follows: $T_{ULdelay}=\text{Tmax}-(T_{UE}-T_{BS})$.

The $T_{ULdelay}$ is user specific. This takes into account the difference in time experienced by the communicating entities in view of the maximum round trip time to be applied by the terminal device 130. In step 480 the terminal device 130 is arranged to adjust a timer 480 with the information on the Tmax wherein the timer is maintained for measuring time from the receipt of frame in the downlink direction. Moreover, the terminal device 130 applies the uplink transmission delay $T_{ULdelay}$ for determining an instant of time of uplink transmission. Finally, the terminal device 130 initiates the uplink transmission at the determined instant of time.

The method as depicted in FIG. 4 may be interpreted so that in steps 410, 420, 430, 440, 450, 460 the terminal device 130 may receive data from which an allowable round trip time of the communication with the base station 110 may be determined (referred with 401 in FIG. 4). In response to that the terminal device 130 may determine a delay of uplink communication in step 470. Finally through the steps 480 and 490 the terminal device 130 may determine a timing advance for initiating the uplink communication on the basis of the data indicating the allowable round trip time and the data indicating the delay of uplink communication for synchronizing the communication with the base station 110 (referred with 403 in FIG. 4).

Figure 5:
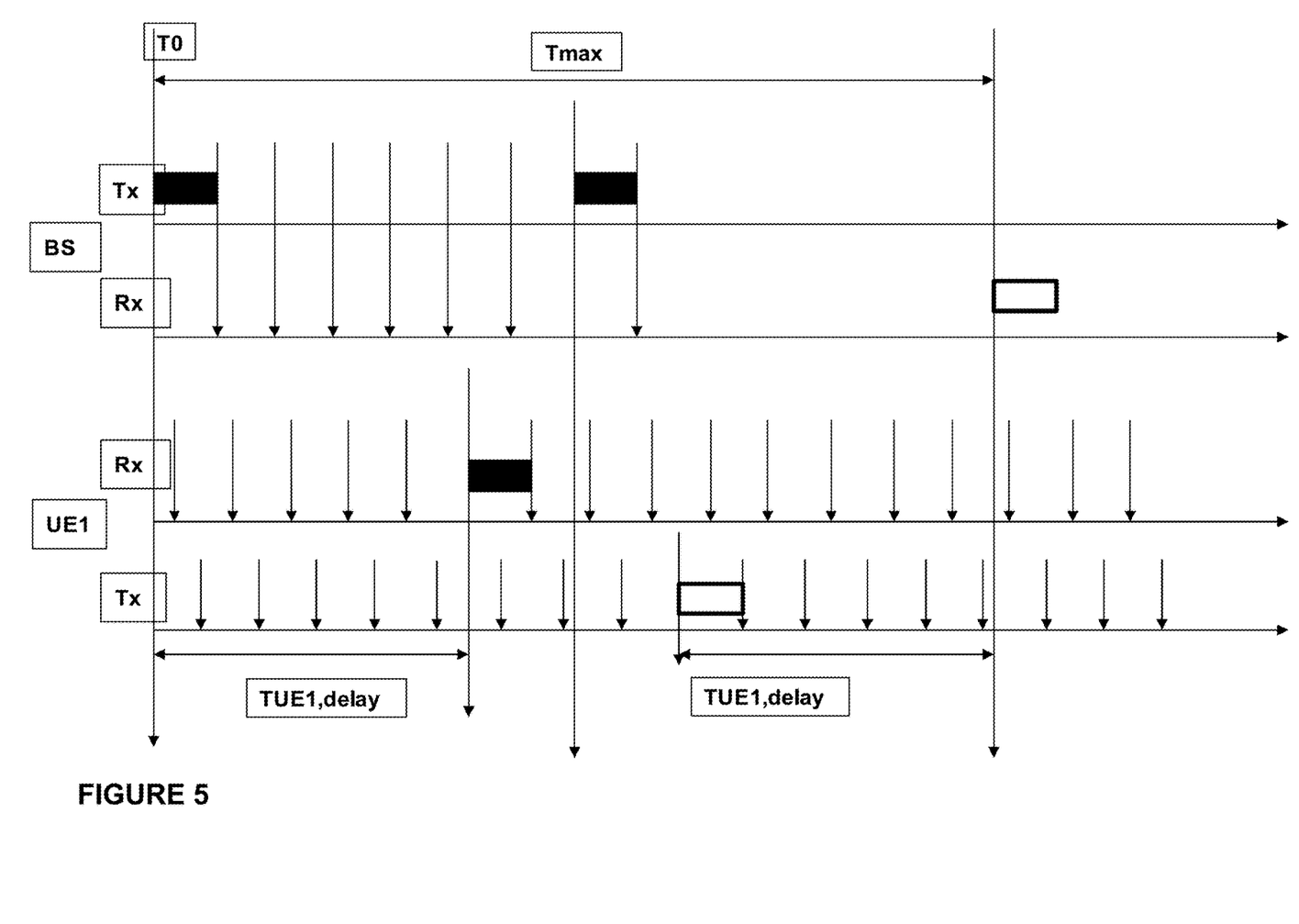
FIG. 5 illustrates schematically aspects relating to a synchronization according to an embodiment of the invention.

FIG. 5 illustrates schematically further aspects of a synchronization process between a base station 110 and a terminal device 130 in an asynchronous communication system. FIG. 5 illustrates at least some aspects between a communication between the base station 110 and the terminal device 130 by illustrating transmitted and received sub-frames between the mentioned nodes and timing of those operations. At an instant of time T0 the base station transmits (Tx) a sub-frame. In accordance with the framework according to example embodiments the base station expects to receive uplink data from the terminal device at an instant of time T0+Tmax wherein the Tmax is defined in the manner as described in the foregoing description. As mentioned, Tmax is the maximum round trip time of a terminal device 130 among all round trip times of all terminal devices 130 served by the base station 110. Due to propagation delay the terminal device 130 referred as UE1 in FIG. 5 receives the sub-frame after a delay $T_{UE1delay}$ and it is determined by the terminal device 130. Hence, the terminal device may be arranged to assume that the propagation delay in uplink direction corresponds to the delay $T_{UE1delay}$ in downlink direction and based on this the terminal device 130 may determine timing advance time for initiating the uplink transmission, which corresponds to (T0+Tmax)−$T_{UE1delay}$. As a result, the terminal device 130 is arranged to initiate the transmission at the timing advance time as defined and the sub-frame is then received by the base station 110 at the instant of time T0+Tmax.

In the described manner it is possible to pair, or link, at the base station 110 a sub-frame transmitted in a downlink direction at an instant of time T0 with a sub-frame received in uplink direction at an instant of time T0+Tmax, and cause the nodes in the communication network to operate accordingly.

At the terminal device 130 similar pairing may be done. At the terminal device 130 the downlink sub-frame received at T0+$T_{UE1delay}$ is paired with uplink sub-frame transmitted at UE at time moment (T0+Tmax)−$T_{UE1delay}$. The time difference between paired downlink and uplink sub-frames is T0+Tmax−2*$T_{UE1delay}$.

For the sake of completeness some further aspects are given to frame numbering in a base station 110 and in a terminal device. As is known the frame numbering may be made by logical numbering. According to the example embodiments the UL and DL frames may be arranged with their own counters in at least one of the following: in a base station; in one or more terminal devices. As provided in the description herein the time corresponding to sub-frame number between uplink UL and downlink DL at base station is shifted by Tmax. If the delay is less than the SF length the frames can be counted by the same counter. If the delay Tmax is more than sub-frame length the uplink and downlink frames are still paired, the counter having the same frame number in UL and DL at BS has actual difference Tmax.

In other words, in accordance with some aspects of the invention the terminal device 130 may be arranged to apply a separate logical numbering for downlink packets and for uplink packets allowing a communication of an uplink packet at a different instant of time than the downlink packet having a same logical number as the uplink packet. For example, the terminal device 130 may be arranged to delay the uplink communication so that the data in the uplink communication is arranged to arrive at the base station 110 at an instant of time corresponding to the allowable round trip time, wherein a delay is determined in accordance with a delay in a communication due to downlink communication.

As regards specifically to frame numbering at the base station 110 the frame number n at T0 in DL is paired with UL frame at time T0+Tmax. The frame numbering at the base station 110 is therefore arranged to have two counters. The shift between the counters is Tmax. As is derivable from the description above the frame counter is used to define when to terminal device 130 has to send answers to DL messages in order to fulfil the requirements according to example embodiments. For instance, in terrestrial system a message received in DL has to be answered in UL. Hence, the message received by UE in time moment Tn=T0+$T_{UE1delay}$ has to be answered in UL T0+$T_{UE1delay}$+k where k is the time reserved for processing at the UE. With the method described in this invention the uplink message arrives at the base station not at time T0+k but at T0+Tmax+k.

On the other hand, as regards to frame numbering at the terminal device 130 the frame n sent out at a moment T0 from the base station 110 is received by at a moment T0+$T_{UEdelay}$ by the terminal device 130. In order to maintain synchronous frame structure at the base station 110, the terminal device 130 has to send out the corresponding UL subframe at T0+Tmax−$T_{UEdelay}$ as mentioned earlier. As a possible implementation the $T_{UEdelay}$ may be composed of two parts: integer amount of sub-frames N and the delay Delta1 that is fraction of sub-frame length, $T_{UE1delay}$=N+Delta1. The sub-frame numbering at the terminal device 130 may be performed with two counters. A first counter is arranged to count the DL sub-frames. In this particular implementation it may be delayed with respect to the base station clock by N subframes. The UL and DL counter difference may be expressed as integer of frames N. The counters are phase shifted by Tmax−2N i.e. sub-frame n in DL is paired physically with UL subframe n-(Tmax−2N). The fraction Delta1 represents the delay with respect to integer border of sub-frames. In DL the sub-frames are delayed with respect to sub-frame border by that amount in UL the sub-frames have to send out by shifting them earlier by that amount (with respect to integer sub-frame time border).

Figure 6:
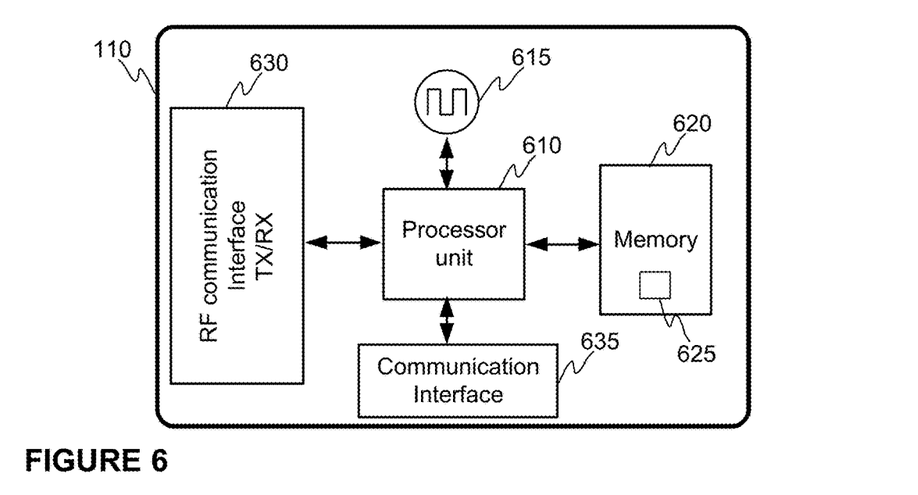
FIG. 6 illustrates schematically an example of a base station according to an embodiment of the invention.

FIG. 6 illustrates schematically, as a block diagram, a base station 110 suitable for performing the operation at least in part as described at least in a description of FIG. 4. The base station may comprise a processor 610, a clock 615, and a memory 620. The memory 620 may store data and computer program code 625. The clock 615 may refer to a device suitable for providing a clock signal to be applied in the operation of the base station 110. The clock 615 may be a separate device in the base station 110 or integrated in some other entity, such as in the processor 610. The base station 110 may further comprise a number of communication interfaces, or communication means, 630, 635 for wired or wireless communication with other apparatuses and/or systems. As it comes to an operation of the base station 110 a first interface 630 may be suitable for serving terminal devices 130 with radio frequencies, whereas a second interface 635 may be suitable for communicating with one or more network nodes residing in a core network. The mentioned entities as well as any other entities may be communicatively coupled to each other via data bus that enables transfer of data and control information between the entities.

Although the processor 610 is depicted as a respective single component, it may be implemented as respective one or more separate processing components. Similarly, although the memory 620 is depicted as a respective single component, it may be implemented as respective one or more separate components, some or all of which may be integrated/removable and/or may provide permanent/semi-permanent/dynamic/cached storage.

The computer program code 625 may comprise computer-executable instructions that implement functions that correspond to steps of the method when loaded into the processor 610 and getting interrupts from the clock 615. As an example, the computer program code 625 may include a computer program consisting of one or more sequences of one or more instructions. The processor 610 is able to load and execute the computer program by reading the one or more sequences of one or more instructions included therein from the memory 620. The one or more sequences of one or more instructions may be configured to, when executed by the processor 610, cause the base station 110 to perform the method will be described.

The computer program code 625 may be provided e.g. a computer program product comprising at least one computer-readable non-transitory medium having the computer program code 625 stored thereon, which computer program code 625, when executed by the processor 610 causes the apparatus to perform the method. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Figure 7:
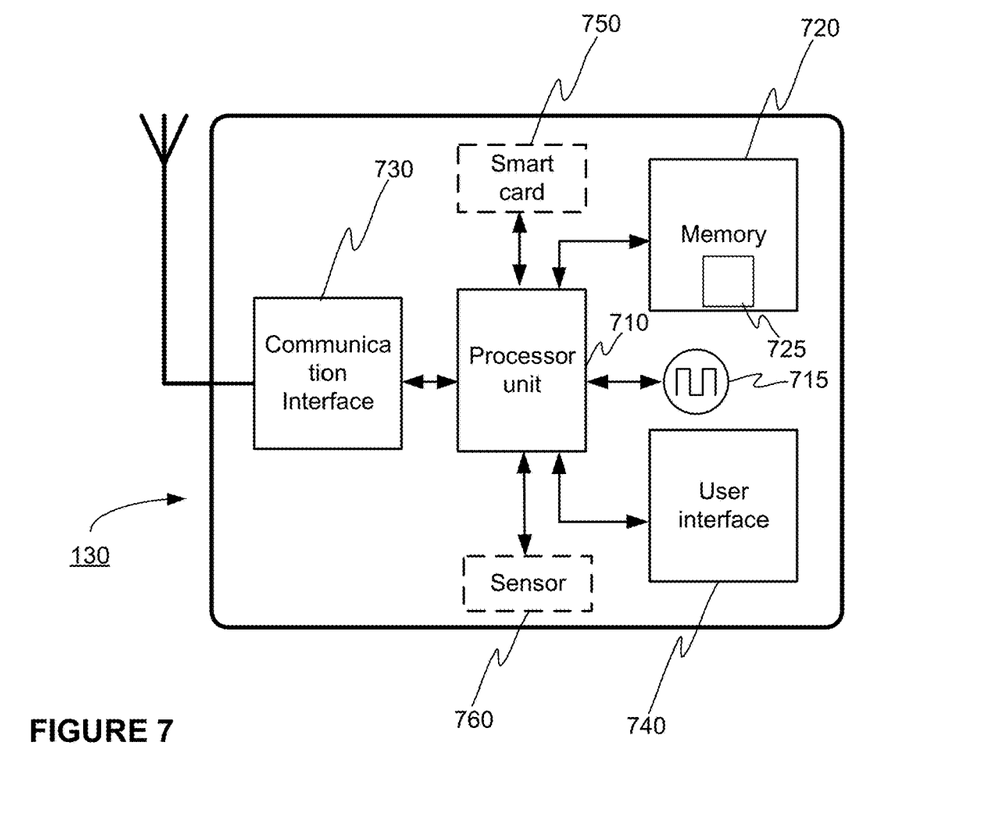
FIG. 7 illustrates schematically an example of a terminal device according to an embodiment of the invention.

FIG. 7 illustrates schematically a non-limiting example of a terminal device 130 according to an example embodiment being suitable for performing an operation at least in part as described at least in a description of FIG. 3. The terminal device 130 may comprise at least one processor 710 arranged to control an operation of the terminal device 130. The terminal device 130 may also comprise at least one memory 720, at least one communication interface 730 and one or more input/output devices as user interface 740 for inputting and outputting information. The terminal device 130 may also comprise a local clock 715 that counts the progress of time. In other words, the clock 715 may refer to a device suitable for providing a clock signal to be applied in the operation of the terminal device 130. The clock 715 may be a separate device in the terminal device 715 or integrated in some other entity, such as in the processor 710. The memory 720 may be arranged to store computer program code 725, but also further data, such as parameter data and any other data e.g. obtained and generated by the terminal device 130. Further, the terminal device 130 may comprise a smart card 750 which may be needed e.g. for accessing to a communication network, such as to a mobile communication network. For example, the smart card 750 may operate as a subscriber identity module (SIM) for the mobile communication network. Still further, the communication device 130 may comprise one or more sensors 760 for obtaining measurement data. In some embodiment, the sensor 760 may obtain information for positioning the terminal device 130.

Although the processor 710 is depicted as a respective single component in FIG. 7, it may be implemented as respective one or more separate processing components. Similarly, although the memory 720 is depicted as a respective single component, it may be implemented as respective one or more separate components, some or all of which may be integrated/removable and/or may pro-vide permanent/semi-permanent/dynamic/cached storage.

The computer program code 725 may comprise computer-executable instructions that implement functions that correspond to steps of the method when loaded into the processor 710 and getting interrupts from the local clock. As an example, the computer program code 725 may include a computer program consisting of one or more sequences of one or more instructions. The processor 710 is able to load and execute the computer program by reading the one or more sequences of one or more instructions included therein from the memory 720. The one or more sequences of one or more instructions may be configured to, when executed by the processor 710, cause the terminal device 130 to perform the method.

The computer program code 725 may be provided e.g. a computer program product comprising at least one computer-readable non-transitory medium having the computer program code 725 stored thereon, which computer program code 725, when executed by the processor 710 with the clock input 715 causes the apparatus to perform the method. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

Figure 8:
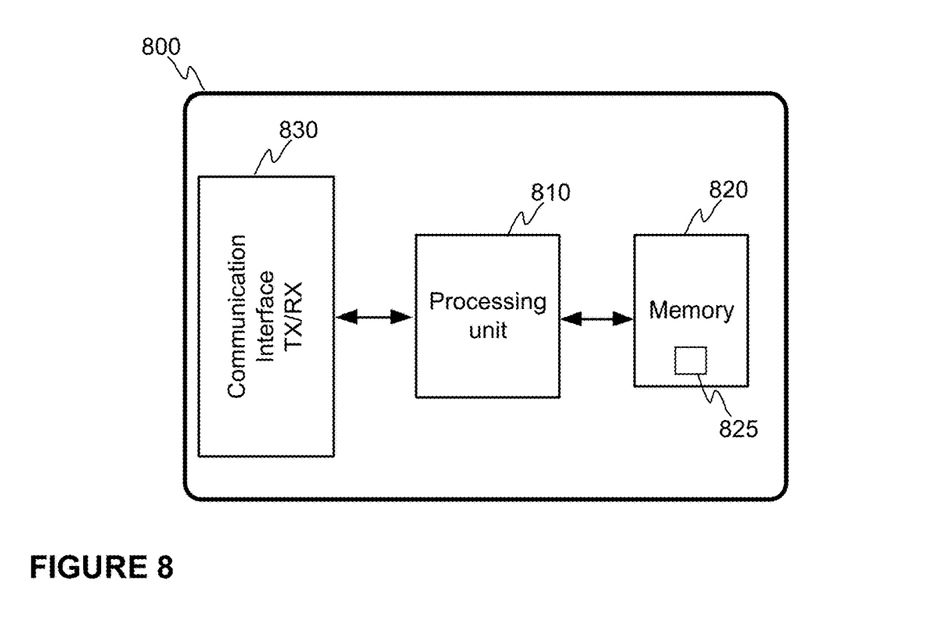
FIG. 8 illustrates schematically an example of a controller according to an embodiment of the invention.

FIG. 8 illustrates schematically a non-limiting example of a controller 145 according to an example embodiment being suitable for performing an operation at least in part as described at least in a corresponding description of FIG. 2. The controller 145 may comprise at least one processor 810 arranged to control an operation of the controller 145. The controller 145 may also comprise at least one memory 820, at least one communication interface 830. The memory 820 may be arranged to store computer program code 825, but also further data, such as parameter data and any other data e.g. received and generated by the controller 145. Although the processor 810 is depicted as a respective single component in FIG. 8, it may be implemented as respective one or more separate processing components. Similarly, although the memory 820 is depicted as a respective single component, it may be implemented as respective one or more separate components, some or all of which may be integrated/removable and/or may provide permanent/semi-permanent/dynamic/cached storage.

The computer program code 825 may comprise computer-executable instructions that implement functions that correspond to steps of the method when loaded into the processor 810. As an example, the computer program code 825 may include a computer program consisting of one or more sequences of one or more instructions. The processor 810 is able to load and execute the computer program by reading the one or more sequences of one or more instructions included therein from the memory 820. The one or more sequences of one or more instructions may be configured to, when executed by the processor 810, cause the controller 145 to perform the method.

The computer program code 825 may be provided e.g. a computer program product comprising at least one computer-readable non-transitory medium having the computer program code 825 stored thereon, which computer program code 825, when executed by the processor 810 causes the controller 145 to perform the method. The computer-readable non-transitory medium may comprise a memory device or a record medium such as a CD-ROM, a DVD, a Blu-ray disc or another article of manufacture that tangibly embodies the computer program. As another example, the computer program may be provided as a signal configured to reliably transfer the computer program.

The controller 145 as schematically illustrated in FIG. 8 may correspond to a network management entity residing in a core network. Alternatively, the controller 145 may be arranged to perform its operation in a radio access network. For example, the functionality of the controller 145 may be implemented by a base station 110 e.g. in such a manner that a control unit of the base station 110, such as a processor 610 with a support of other entities, may perform the functionality of the controller 145.

The aspects of the present invention are herein described mainly in a communication environment applying satellite system as a part of the communication path. However, the present invention is not only limited to that communication environment only, but the present invention is applicable in any other communication system, and communication environment. Especially applicable the invention is in environments in which the round trip time may be long causing connectivity challenges in network environments according to prior art. A further non-limiting example of the communication systems suitable for utilizing the present invention may e.g. be so-called cloud radio access network environment.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for synchronizing a communication with a base station, the method comprising:
   receiving, by a terminal device, data indicating an allowable roundtrip time of the communication with the base station;
   determining, by the terminal device, a delay of uplink communication from the terminal device to the base station; and
   determining, by the terminal device, a timing advance time for initiating the uplink communication on a basis of the data indicating the allowable roundtrip time and the data including the delay of uplink communication for synchronizing the communication with the base station.

2. The method of claim 1, wherein a separate logical numbering for downlink packets and uplink packets is applied by the terminal device allowing a communication of an uplink packet at a different instant of time than the downlink packet having a same logical number as the uplink packet.

3. The method of claim 2, wherein the uplink communication is delayed by the terminal device to arrange the data in the uplink communication to arrive at the base station at an instant of time corresponding to the allowable roundtrip time, wherein the delay of the uplink communication is determined in accordance with a delay in a communication due to downlink communication.

4. The method of any of claim 3, wherein the delay of uplink communication from the terminal device to the base station corresponds to a delay of downlink communication from the base station to the terminal device.

5. The method of claim 1, further comprising:
receiving, by the base station data indicating an allowable roundtrip time of the communication with the terminal device; and
adjusting, by the base station, a counter for downlink communication and a counter for uplink communication in accordance with the data indicating the allowable roundtrip time for synchronizing the communication with the terminal.

6. The method of claim 1, wherein the downlink communication includes downlink subframes, and the uplink communication includes uplink subframes, and further comprising:
shifting, by the base station, a time corresponding with a subframe number between the downlink communication and the uplink communication by the allowable roundtrip time.

7. The method of claim 1, wherein the downlink communication includes downlink subframes, and the uplink communication includes uplink subframes, and further comprising:
counting, by the terminal, the uplink and downlink subframes with a single counter when the allowable roundtrip time is less than a length in time of the subframes, counting the uplink and downlink subframes with multiple counters when the allowable roundtrip time is greater than the length in time of the subframes.

8. The method of claim 7, wherein when the allowable roundtrip time is greater than the length in time of the subframes, the multiple counters include an uplink counter and a downlink counter, and a difference in the uplink counter and a downlink counter is expressed as an integer number of frames.

9. The method of claim 8, wherein the difference in the uplink counter and the downlink counter indicates a delay between the uplink and downlink subframes based on the allowable roundtrip time.

10. A wireless system, comprising;
a base station;
a terminal device configured to synchronize a communication with the base station, the terminal device comprising:
at least one processor; and
at least one memory including computer program code;
the at least one memory and the computer program code configured to, with the at least one processor, cause the terminal device to:
receive data indicating an allowable roundtrip time of the communication with the base station;
determine a delay of uplink communication from the terminal device to the base station, and
determine a timing advance time for initiating the uplink communication on the basis of the data indicating the allowable roundtrip time and the delay of uplink communication for synchronizing the communication with the base station.

11. The wireless system of claim 10, wherein a separate logical numbering for downlink packets and uplink packets is applied by the terminal device allowing a communication of an uplink packet at a different instant of time than the downlink packet having a same logical number as the uplink packet.

12. The wireless system of claim 11, wherein the uplink communication is delayed by the terminal device to arrange the data in the uplink communication to arrive at the base station at an instant of time corresponding to the allowable roundtrip time, wherein the delay of the uplink communication is determined in accordance with a delay in a communication due to downlink communication.

13. The wireless system of claim 12, wherein the delay of uplink communication from the terminal device to the base station corresponds to a delay of downlink communication from the base station to the terminal device.

14. The wireless system of claim 10, wherein the base station comprises:
at least one processor; and
at least one memory including computer program code;
the at least one memory and the computer program code configured to, with the at least one processor, cause the base station to:
receive data indicating an allowable roundtrip time of the communication with the terminal device;
adjust a downlink counter for downlink communication and an uplink counter for uplink communication in accordance with the data indicating the allowable roundtrip time for synchronizing the communication with the terminal device.

15. The wireless system of claim 14, wherein the downlink communication includes downlink subframes, and the uplink communication includes uplink subframes, wherein the computer program code is further configured to, with the at least one processor, cause the base station to:
shift a time corresponding with a subframe number between the downlink communication and the uplink communication by the allowable roundtrip time.

16. The wireless system of claim 10, wherein the downlink communication includes downlink subframes, and the uplink communication includes uplink subframes, and wherein the terminal device is operative to:
count the uplink and downlink subframes with a single counter when the allowable roundtrip time is less than a length in time of the subframes, counting the uplink and downlink subframes with multiple counters when the allowable roundtrip time is greater than the length in time of the subframes.

17. The wireless system of claim 16, wherein when the allowable roundtrip time is greater than the length in time of the subframes, the multiple counters include an uplink counter and a downlink counter, and a difference in the uplink counter and a downlink counter is expressed as an integer number of frames.

18. The wireless system of claim 17, wherein the difference in the uplink counter and the downlink counter indicates a delay between the uplink and downlink subframes based on the allowable roundtrip time.

* * * * *